United States Patent Office.

SAMUEL C. UPHAM, OF PHILADELPHIA, PENNSYLVANIA.

Letters Patent No. 62,512, dated February 26, 1867.

IMPROVED NUTRITIVE AND CURATIVE PREPARATION.

*The Schedule referred to in these Letters Patent and making part of the same.*

TO ALL WHOM IT MAY CONCERN:

Be it known that I, SAMUEL C. UPHAM, of Philadelphia, Pennsylvania, have invented an Improved Nutritive and Curative Preparation; and I do hereby declare the following to be a full, clear, and exact description of the manner in which the same is made.

To one gallon of hot water are added four ounces of hypophosphite of soda, three ounces of hypophosphite of lime, and fourteen pounds of sugar. When all the ingredients are thoroughly dissolved, two pounds of Tourtlelot's extract of beef, and two fluid drachms of the preparation known as "phenol sodique" are added to the solution, when the medicine will be ready for use. Extracts of meat, water, and sugar are used substantially in the proportions above named in a nutritive medicine, for which Letters Patent were allowed to me on the twenty-sixth day of January, 1867, and by the addition to this preparation of "phenol sodique," an efficient nutritive and curative composition, available in many forms of sickness, is produced, the medicine being specially useful in diseases of the throat and lungs. Although I prefer to add the hypophosphites of soda and lime, one or both of these ingredients may be dispensed with.

I claim as my invention, and desire to secure by Letters Patent—

1. A nutritive and curative preparation consisting of extract of meat, sugar, water, and "phenol sodique," combined in the manner and proportions substantially as described.

2. The combination of the above, and the hypophosphites of soda and lime, or either of them.

In testimony whereof I have signed my name to this specification in the presence of two subscribing witnesses.

SAMUEL C. UPHAM.

Witnesses:
CHARLES E. FOSTER,
W. J. R. DELANY.